United States Patent [19]
Jones

[11] Patent Number: 5,371,841
[45] Date of Patent: Dec. 6, 1994

[54] PROGRESSIVE BIT PLANE RECONSTRUCTION METHOD

[75] Inventor: Paul W. Jones, Churchville, N.Y.

[73] Assignee: Eastman Kodak Company, Rochester, N.Y.

[21] Appl. No.: 923,198

[22] Filed: Jul. 31, 1992

[51] Int. Cl.$^5$ ............................................. G06F 15/00
[52] U.S. Cl. ................................................... 395/133
[58] Field of Search ................... 395/133, 139; 382/46, 382/56; 345/147, 148, 149, 117; 358/426, 261.1, 261.2, 261.3, 427, 431

[56] References Cited

U.S. PATENT DOCUMENTS

| | | | |
|---|---|---|---|
| 4,712,099 | 12/1987 | Maeda | 340/703 |
| 4,808,989 | 2/1989 | Tabata et al. | 340/750 |
| 4,825,388 | 4/1989 | Dailey et al. | 364/518 |
| 4,829,291 | 5/1989 | Elgood et al. | 340/703 |
| 4,882,683 | 11/1989 | Rupp et al. | 364/521 |
| 4,907,002 | 3/1990 | Kawada | 341/172 |
| 4,943,934 | 7/1990 | Hosoda | 364/518 |
| 4,958,146 | 9/1990 | Priem et al. | 340/703 |
| 5,083,257 | 1/1992 | Kennedy | 395/131 |

*Primary Examiner*—Phu K. Nguyen
*Attorney, Agent, or Firm*—Edward Dugas

[57] ABSTRACT

An method and associated apparatus for mapping received bits in a progressive bit plane scheme to output values which are derived by combining all previously received bits with the most recently received bits and appending additional bits to provide output values that are distributed across the output display range so as to improve recognizability of reconstructed images when only a few bit planes have been received.

17 Claims, 9 Drawing Sheets

PROGRESSIVE BIT PLANE RECONSTRUCTION METHOD

TECHNICAL FIELD OF THE INVENTION

The present invention is related to the field of digital image processing and more specifically to the transmission and reception of digital image data in a progressive manner.

BACKGROUND OF THE INVENTION

In progressive transmission, partial image information is transmitted in a number of successive stages, and at each stage, an approximation to the original image is reconstructed at the receiver. These reconstructed images improve in quality as additional information is transmitted. Progressive transmission is motivated by the need to transmit images over low-bandwidth channels (relative to the amount of data), e.g., telephone lines, particularly in those cases where quick recognition is important or total transmission time may be limited.

One approach to progressive transmission is to successively transmit the bit planes of a continuous-tone image. Bit planes are binary images that are formed by selecting a single bit from the same position in the binary representation of each pixel. A k-bit image with dimensions N×N can thus be decomposed into k binary images, each with dimensions N×N. An example of bit planes for an 8-bit image is shown in FIG. 1, where the image labeled 0 is the least significant bit (LSB) plane and the image labeled 7 is the most significant bit (MSB) plane. It can be seen that the most significant bit plane contains major structural information and provides a reasonable approximation to the original image. As a result, progressive transmission usually begins by transmitting the MSB plane first and proceeds through the other bit planes in order. At each stage in the reconstruction, one or more bit planes may be transmitted. Upon receiving the LSB plane, a lossless reconstruction of the image can be obtained. To make the transmission scheme more efficient, coding techniques can be applied to the bit planes; this aspect of bit planes is not necessary (nor detrimental) to the invention disclosed herein.

In progressively reconstructing an image using the bit planes, output levels must be specified at each stage in order to map the received data to an output device. For example, if one bit plane (the MSB plane) is received, two output levels are required, which might be 0 and 255 for an 8-bit output device. If two bit planes are received, four output levels are required, e.g., (0, 85, 170, and 255) for an 8-bit device, and so on as more bit planes are received. There are a number of ways that these output values can be assigned. A simple approach is to assume the output buffers are initially filled with all 0's or all 1's. As bits are received, they are placed in the appropriate positions in the buffers. For example, if the buffers are initially filled with all 0's, the two possible output values after the MSB plane is received are '00000000' and '10000000' (0 and 128) for an 8-bit display. After two bit planes are received, the four possible output values are '00000000', '01000000', '10000000', and '11000000' (0, 64, 128, and 192). With this approach, the images start out dark (assuming 0 represents black) and become lighter as more levels are added. If the output buffers are initially filled with all 1's, then the image starts out light and becomes darker, e.g., the first two output levels are '01111111' and '11111111' (127 and 255).

A more sophisticated approach is to use look-up tables so that the output levels at each stage can be varied at will. A block diagram representing a prior-art technique is shown in FIG. 2, wherein 0 through k-1 bit planes are transmitted successively, starting with the bits of bit plane k-1 to the input of a bit combination logic block 12. Each bit in a bit plane corresponds to a single pixel of the original image, and the combination of one or more of the bits, corresponding to a pixel can be used to form a digital representation of the pixel for later reproduction. To this end, block 12 also receives as an input from a previous bits recovery logic block 20, the bits from previously received bit planes and appends the most recently received bit to the previously received bits of the corresponding pixel and provides this sequence of bits at its output. The previous bits recovery logic block 20 takes as an input from an n-bit output frame buffer 18, the previously reconstructed output value for the corresponding pixel and outputs the received bit sequence that produced this reconstructed value. A means for performing the recovery of previously received bits from the reconstructed output value is demonstrated in the section on Description of the Preferred Embodiments. The appended sequence of bits from block 12 is directed to the input of a look-up address generation logic block 14. The bit sequence is used to generate a unique address to be used as an entry into a look-up table 16. A block diagram illustrating a prior art method for generating the address is shown in FIG. 3, where the received bits are placed in an address buffer 32, and then additional bits are appended using a logic block 34 to complete the address. The appended bits consist of a variable number of "don't care" bits, i.e., either 0 or 1, plus a fixed number of steering bits to direct the received bit sequence to the appropriate portion of the look-up table for the total number of bits received. For an output device supporting n bits, if we have received a total of m bits for each pixel, then n-m "don't care" bits are appended and the number of steering bits is ceil[$\log_2 n$], where ceil[x] indicates the smallest integer larger than x. An example is shown in Table 1 for the first three received bits of an image with an 8 bit output device, where an "x" in the look-up table address represents a "don't care" bit. For this example, the received bits are appended with enough "don't care" bits to make a total of eight bits, and then three steering bits are added to direct the result to the appropriate section of the look-up table. Returning to FIG. 2, the look-up table address is applied to an output value look-up table 16 to access an n-bit output value that is placed in the output frame buffer 18 as a cumulative representation of the received bits for the corresponding pixel. An n-bit display 10 is coupled to the output buffer to provide a visual image of the progression of the reconstruction.

TABLE 1

| Example of look-up table addresses. | |
|---|---|
| Received Bits | Look-up Table Address |
| 0 | 0xxxxxxx000 |
| 1 | 1xxxxxxx000 |
| 00 | 00xxxxxx001 |
| 01 | 01xxxxxx001 |
| 10 | 10xxxxxx001 |
| 11 | 11xxxxxx001 |
| 000 | 000xxxxx010 |

TABLE 1-continued

Example of look-up table addresses.

| Received Bits | Look-up Table Address |
| --- | --- |
| 001 | 001xxxxx010 |
| 010 | 010xxxxx010 |
| 011 | 011xxxxx010 |
| 100 | 100xxxxx010 |
| 101 | 101xxxxx010 |
| 110 | 110xxxxx010 |
| 111 | 111xxxxx010 |

Using this look-up table approach, an important question is what output levels should be used to maximize image recognizability at the early stages of the progression. The answer to this is not clear, but two approaches suggest themselves. One is to use the mean values of the possible ranges represented by the transmitted bits. This is the optimal mapping in a mean-squared error (MSE) sense. For example, after the MSB plane is received, the two possible ranges for an 8-bit display are 0 to 127 and 128 to 255, and the corresponding mean values are 63 and 191. After two bits are received, the mean values for the four possible ranges are (31, 95, 159, 223). Note that this optimal MSE approach does not take advantage of the full dynamic range of the output display, which suggests another method where the possible output values are equally spaced across the full range. For this method, the output values for an 8-bit display would be (0,255) after the MSB plane is received, (0, 85, 170, 255) after two bits, and so on.

Despite offering great flexibility in the mapping of bit planes to output values, the look-up table method has a potential disadvantage, namely, output devices with a large dynamic range, e.g., 10 or 12 bits, require fairly large look-up tables. This is because the address used as an entry into the look-up table consists of the received bits, plus the steering bits needed to direct the received bits to the appropriate portion of the table for the total number of bits received. For example, a 12-bit output device must have a table that can support a maximum of 12 received bits plus 4 steering bits, for a total size of $2^{16}$ entries. In addition, the look-up table method requires at least some additional circuitry to generate the address of the memory location storing the appropriate output value. Two publications of interest for their teachings in this area are:

1. K.-H. Tzou, "Progressive image transmission: a review and comparison of techniques," Opt. Eng., 26(7), pp. 581–589 (1987); and
2. M. Rabbani and P. W. Jones, *Digital Image Compression Techniques*, SPIE Tutorial Series, Vol. TT7, SPIE Press, Bellingham, Wash., pp. 49–57 (1991).

SUMMARY OF THE INVENTION

The present invention describes methods and associated apparatus for generating the output values for progressive bit plane reconstructions, in accordance with mean value and full dynamic range approaches. The advantage of these methods and associated apparatus is that they require no look-up tables, but instead rely on fairly simple circuitry (primarily shift registers) to directly derive the output values from the received bits. This circuitry is of the same complexity as that required for the address generation used in the look-up table method. Another advantage is that the techniques used to generate these values can easily map the original data and its associated bit planes to output devices with any display bit depth.

In the preferred method of the present invention for generating n-bit output values in a progressive bit plane reconstruction scheme, wherein an image is represented by a matrix of pixel values with each pixel value being represented by k bits, and wherein each bit plane is formed from the matrix of like ordered bits in the k-bit representation, comprising, for each pixel, the following steps are implemented:

a) receiving one or more bits of the k-bit representation to produce a sequence of m bits, where m represents the total number of received bits;

b) forming an n-bit output value by combining an n-m bit sequence with the sequence of m bits of step a);

c) buffering the formed n-bit output value;

d) recovering the previously received m bits from the buffered n-bit output value;

e) receiving one or more of the remaining bits of the k-bit representation;

f) combining the received bits of step e) with the recovered m bits of step d) to form a new m-bit sequence, where m is incremented to represent the new total nurser of received bits;

g) forming a new n-bit output value by combining an n-m bit sequence with the m-bit sequence of step f);

h) buffering the formed n-bit output value of step g); and i) repeating steps d) through h) to a desired received bit depth.

In a preferred apparatus embodiment of the invention there is provided combination logic for receiving on a first input one or more bits of the k-bit representation and for receiving on a second input recovered previously received bits and for combining the bits received from the first input with the bits received from the second input to produce a sequence of m bits, where m represents the total number of received bits. Additionally, output value generation logic forms an n-bit output value by combining an n-m bit sequence with the sequence of m bits from the combination logic. A buffer is used to buffer the formed n-bit output value from the output value generation logic. Recovery logic recovers all previously received m bits from the buffered n-bit output value and provides the recovered previously received m bits to the second input of the combination logic. The outputs from the buffer are the n-bit output values which may be displayed on a display device for viewing of the reconstructed versions of the original image.

From the foregoing it can be seen that it is a primary object of the present invention to provide an improved method for accomplishing progressive bit plane reconstruction.

It is a further object of the present invention to provide a progressive bit plane reconstruction method that is implementable without the use of look-up tables.

It is another object of the present invention to provide a progressive bit plane reconstruction method that is implemented with simple hardware.

It is still another object of the present invention to provide a progressive bit plane reconstruction method that allows any arbitrary number of bit planes to be progressively reconstructed to any arbitrary bit depth.

These and other objects of the present invention will become more apparent when taken in conjunction with the following description and drawings wherein like characters indicate like parts and which drawings form a part of the present description.

DESCRIPTION OF THE PREFERRED EMBODIMENTS

In the following descriptions, examples are presented using an 8-bit output device (value from 0 to 255). However, as we will describe in this section, the methods work for any bit depth. Further, the descriptions in this section assume that a new output value is produced for each received bit from a bit plane; this is not a necessary condition for the described methods, and in fact, it is possible to receive the corresponding bits from more than one bit plane prior to reconstructing the appropriate output value. Note that the format used for binary numbers is (MSB ... LSB). As a result, left-shifting means shifting the LSB towards the MSB; similarly, right-shifting means shifting the MSB towards the LSB.

Figure 1:
FIG. 1 illustrates, in a sequence labeled 0 through 7, the bit planes of an eight bit image.
Figure 2:
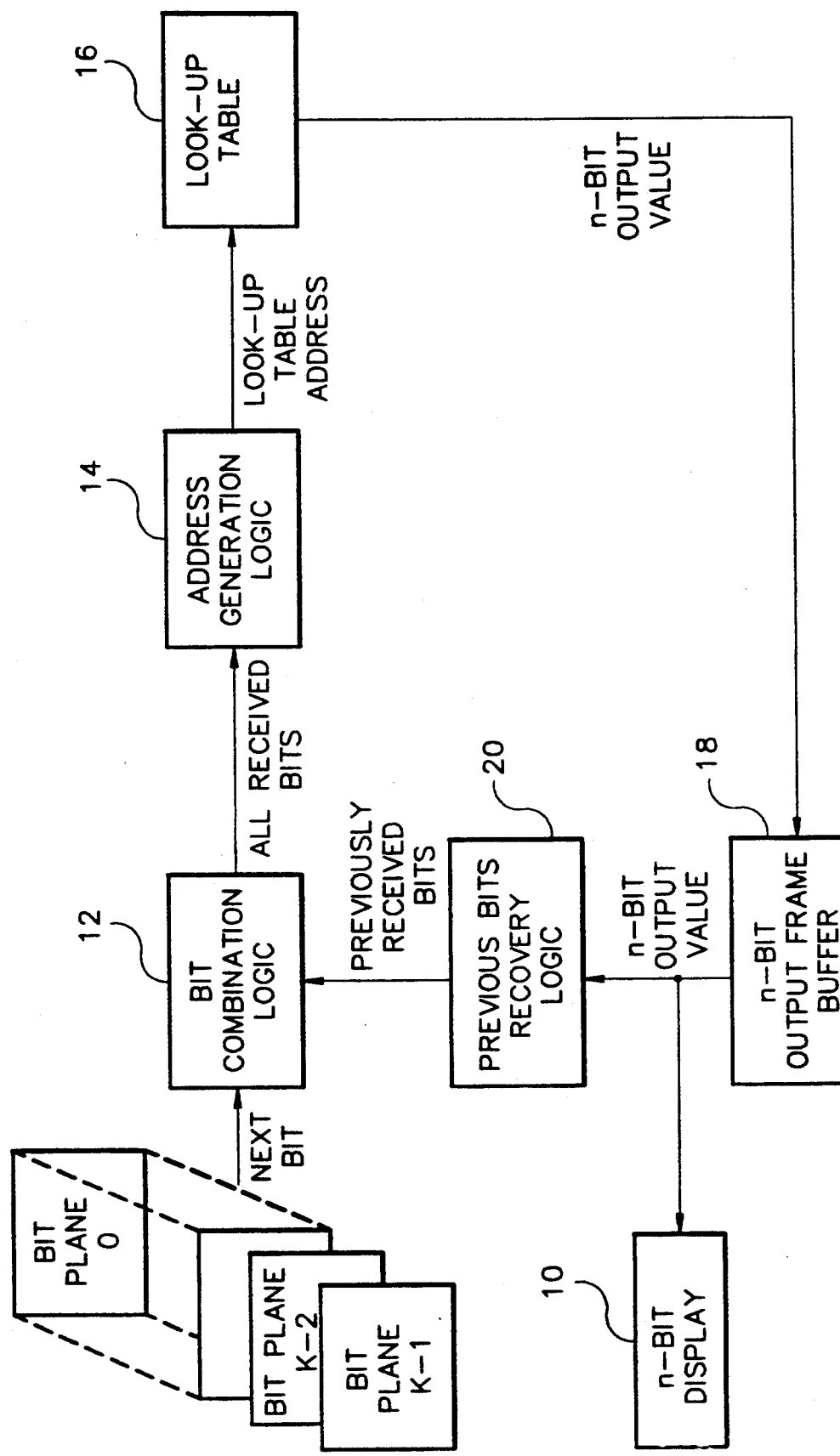
FIG. 2 illustrates in block diagram form a prior-art method for progressively reconstructing an image using a look-up table to determine output levels.
Figure 3:
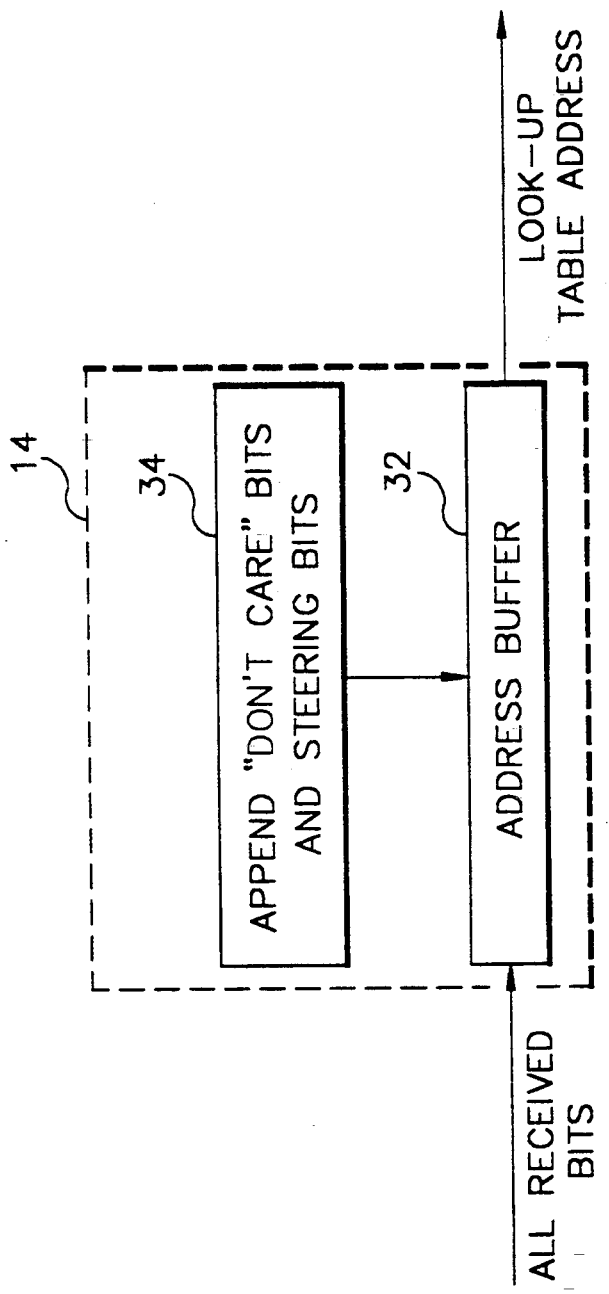
FIG. 3 illustrates in block diagram form a particular arrangement for generating the look-up table address required in the prior art method of FIG. 2.
Figure 4:
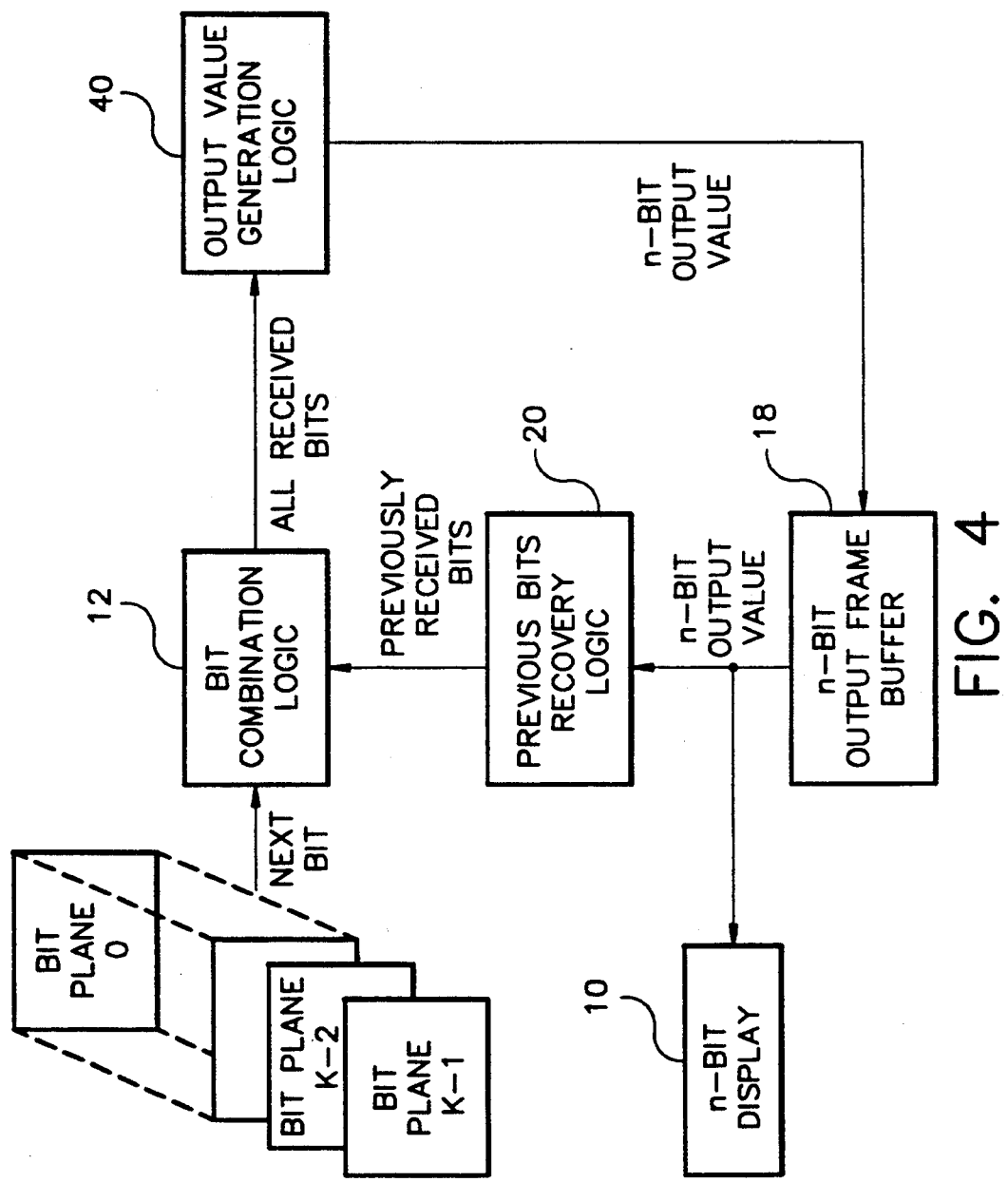
FIG. 4 illustrates in block diagram the preferred embodiment of the invention.

Referring to FIG. 4, in the preferred embodiment of the invention, the output value generation logic block 40 has replaced the address generation logic block 14 and look-up table 16 shown in prior art FIG. 2, wherein like numbers indicate like components in both FIGS. 2 and 4.

Mean value approach

Figure 5:
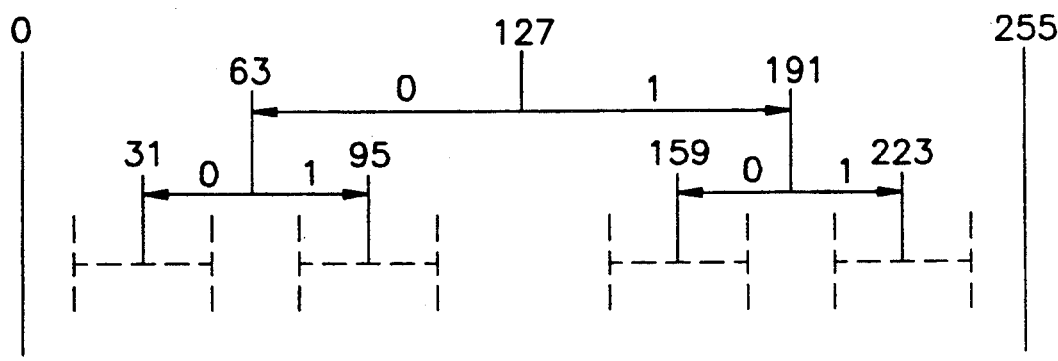
FIG. 5 illustrates a tree diagram useful in understanding the mean value technique of the present invention.

As stated previously, in the mean value approach, we map the received bits to the mean of the range represented by those bits. This process can be viewed as traversing the nodes of a tree diagram, where the received bits give the path through the tree. As shown in FIG. 5, the highest node in the tree is the overall mean of the output range, e.g., 127 for an 8-bit display. Upon receiving the MSB, we branch to either 63 (=127−64) if a '0' is received or 191 (=127+64) if a '1' is received. After the next bit is received, we branch to either 31 (=127−64−32) if '00' is received, 95 (=127−64−+32) if '01' is received, 159 (=127+64−32) if '10' is received, or 223 (=127+64+32) if '11' is received. Essentially, this processes is doing a successive approximation based on the received bits. The corresponding binary representations for the possible 8-bit output values at each level are given in Table 2 for the first three received bits.

TABLE 2

| Binary representation for mean value approach. | | |
|---|---|---|
| Received Bits | Output Values | Binary Representation |
| 0 | 63 | 00111111 |
| 1 | 191 | 10111111 |
| 00 | 31 | 00011111 |
| 01 | 95 | 01011111 |
| 10 | 159 | 10011111 |
| 11 | 223 | 11011111 |
| 000 | 15 | 00001111 |
| 001 | 47 | 00101111 |
| 010 | 79 | 01001111 |
| 011 | 111 | 01101111 |
| 100 | 143 | 10001111 |
| 101 | 175 | 10101111 |
| 110 | 207 | 11001111 |
| 111 | 239 | 11101111 |

Figure 6:
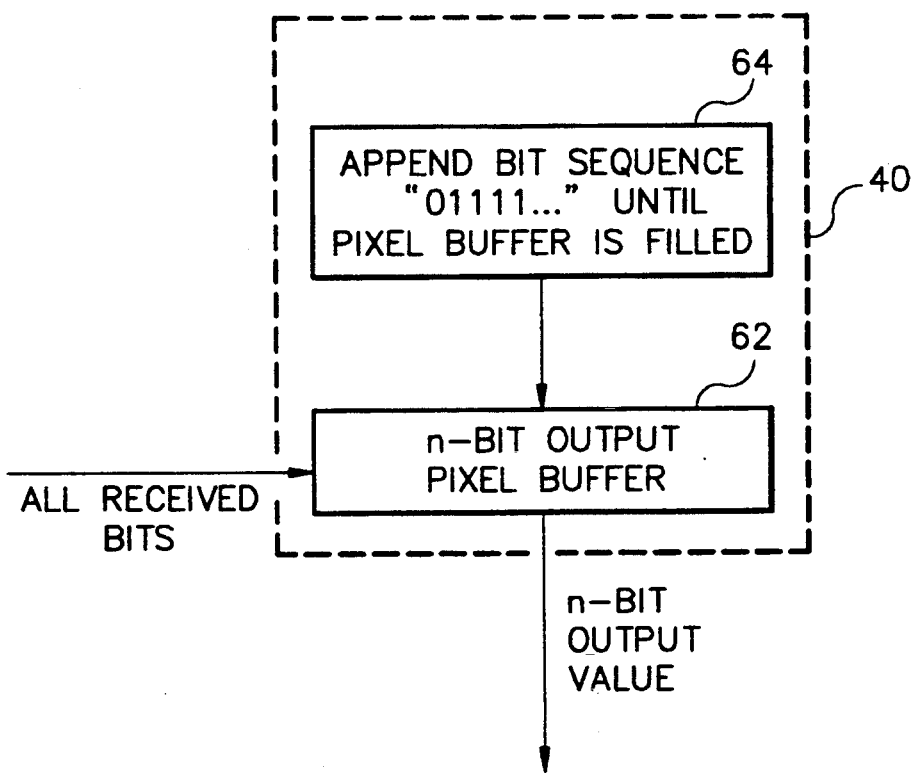
FIG. 6 illustrates in further detail the mean value technique implementation used in the output value generation logic block of FIG. 4.

Table 2 provides support for generating the output values in accordance with the mean value approach. Referring to FIG. 6, all previously received m bits are placed in an n-bit output pixel buffer 62 and the n-m bit sequence "01111..." is appended using the output of a logic block 64 so as to fill the output pixel buffer 62. The output of filled buffer 62 represents the reconstructed output value that is derived using the mean value approach described previously.

An advantage of this method is that the correct output values can be generated regardless of the bit depth of the output. For example, if the output display is 10 bits deep, rather than 8 bits, we merely have to start with a 10-bit output buffer, and produce either '0011111111' (=255) or '1011111111' (=767) upon receiving the first bit; these are the correct output values for the 10-bit display. Of course, since we started with 8-bit data, we can only recover 256 levels at the end of the transmission, but the output values will be correct over this range. Similarly, 10-bit data can be progressively mapped to an 8-bit output device using this procedure, but of course only 8 bits of the original data can be used with the 8 bit output device.

Figure 7:
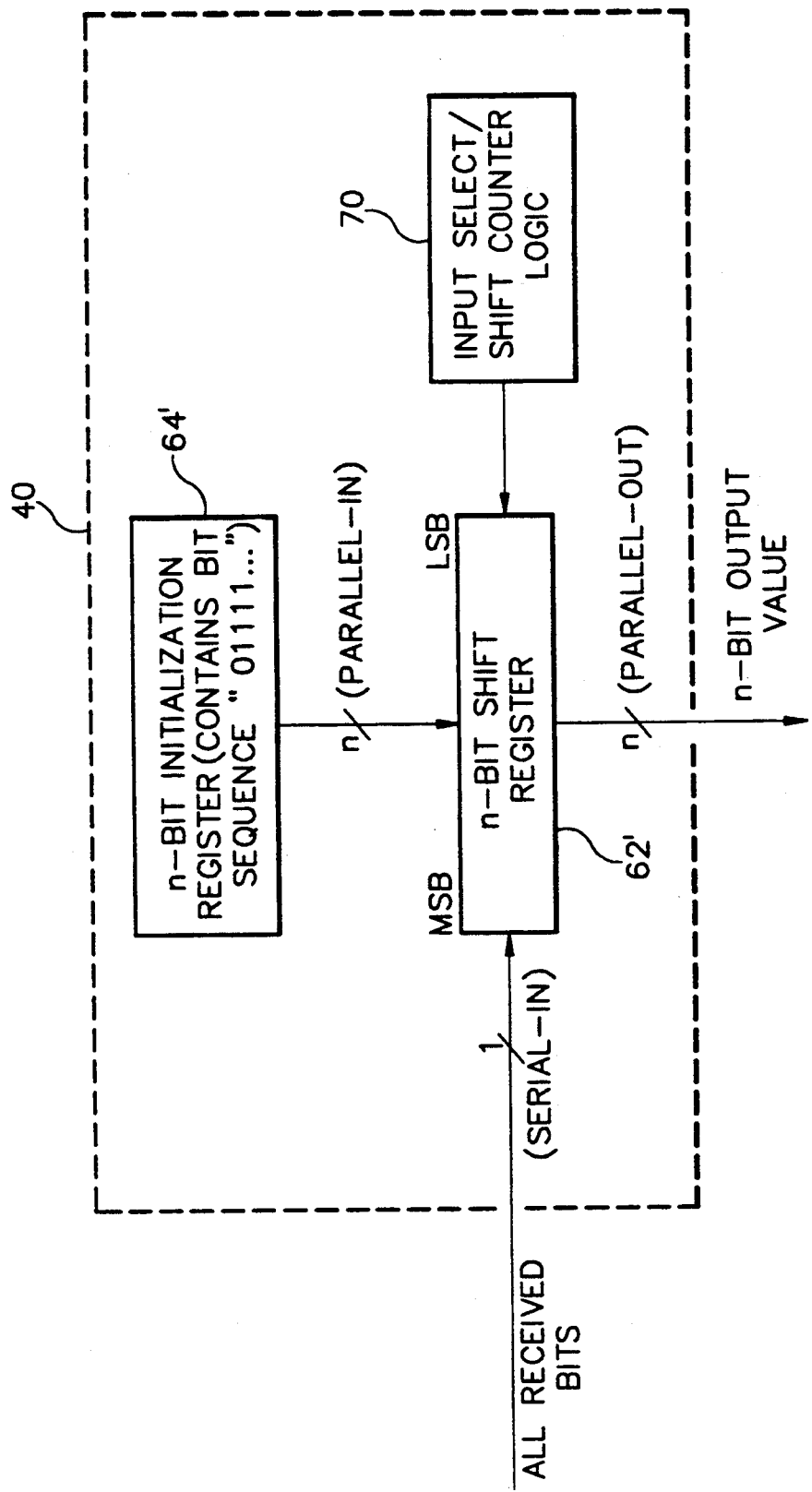
FIG. 7 illustrates a specific hardware implementation of the output value generation logic block of FIG. 6.

There are a number of ways to implement this process using simple digital hardware; one such implementation is illustrated in FIG. 7, wherein a serial in/parallel in/parallel out n-bit shift register 62' is initialized with the n-bit sequence "01111..." from an initialization register 64' using the parallel input to shift register 62'. The received bit sequence is then right shifted into the shift register 62' using the serial input, starting with the least significant bit that has been received up to this point. An input select/shift counter logic 70 is used to select whether the input is taken from the parallel or the serial inputs to register 62'. For each pixel value that is to be reconstructed, the input select is initially set to the parallel input for initialization of the shift register 62', and after initialization, the input select is switched to the serial input to input the received bits. Additionally, logic 70 determines the number of shifts needed to input all received bits into register 62' from the serial input. For a received sequence of m bits, a total of m shifts are required. Register 62' outputs in parallel the reconstructed n-bit output value used to represent the pixel using the mean value approach described previously.

Full dynamic range approach

In the full dynamic range approach, we map the possible outputs to equally spaced values across the full dynamic range of the output device. As an example, the binary representations for the possible 8-bit output values at each level are given in Table 3 for the first three received bits.

TABLE 3

Binary representation for full dynamic range approach.

| Received Bits | Output Values | Binary Representation |
|---|---|---|
| 0 | 0 | 00000000 |
| 1 | 255 | 11111111 |
| 00 | 0 | 00000000 |
| 01 | 85 | 01010101 |
| 10 | 170 | 10101010 |
| 11 | 255 | 11111111 |
| 000 | 0 | 00000000 |
| 001 | 36 | 00100100 |
| 010 | 73 | 01001001 |
| 011 | 109 | 01101101 |
| 100 | 146 | 10010010 |
| 101 | 182 | 10110110 |
| 110 | 219 | 11011011 |
| 111 | 255 | 11111111 |

Figure 8:
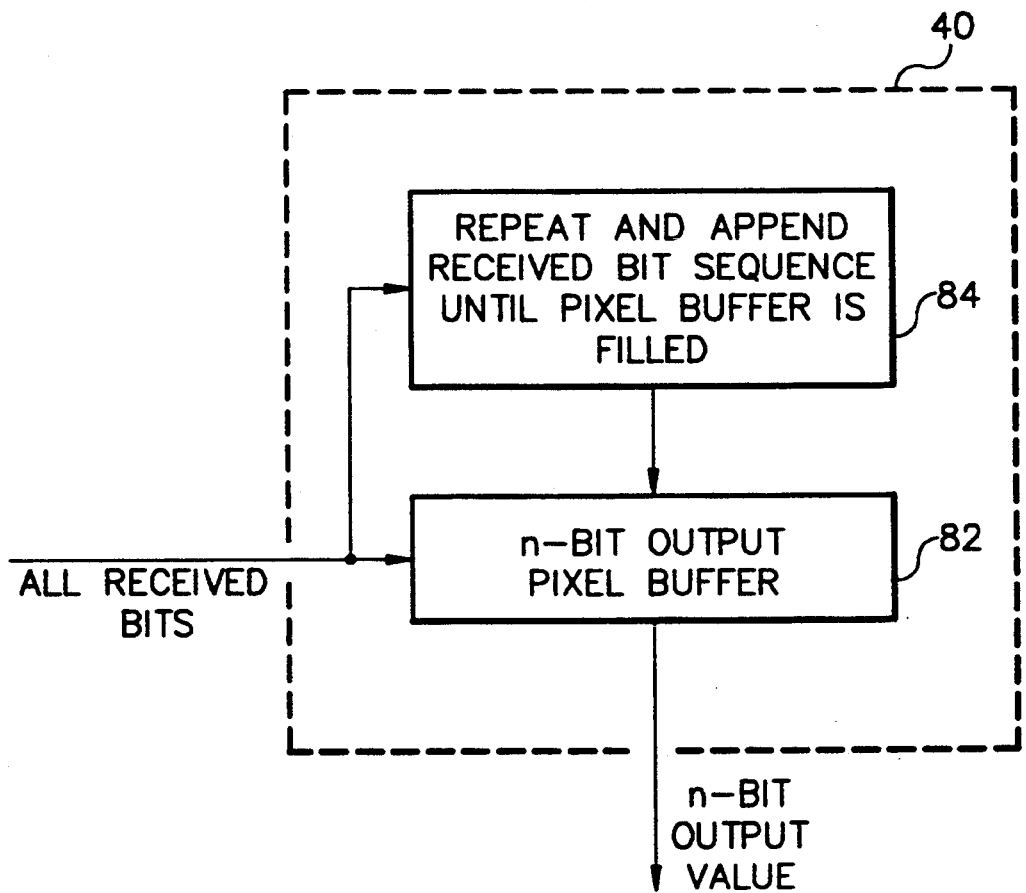
FIG. 8 illustrates in further detail the full dynamic range technique implementation used in the output value generation logic block of FIG. 4.

Table 3 provides support for generating the output values in accordance with the full dynamic range approach. Referring to FIG. 8, all previously received bits are placed in an n-bit output pixel buffer 82. Using a logic block 84, the received bit sequence is retreated and appended to the contents of the pixel buffer 82 until the buffer is filled. For example, if '010' is received, it is repeated as '010 010 010 . . .' to fill the buffer. The output of filled buffer 82 represents the reconstructed output value that is derived using the full dynamic range approach described previously. Importantly, this technique always produces the correct output value regardless of the bit depth of the output pixel buffer or the bit depth of the original image.

Figure 9:
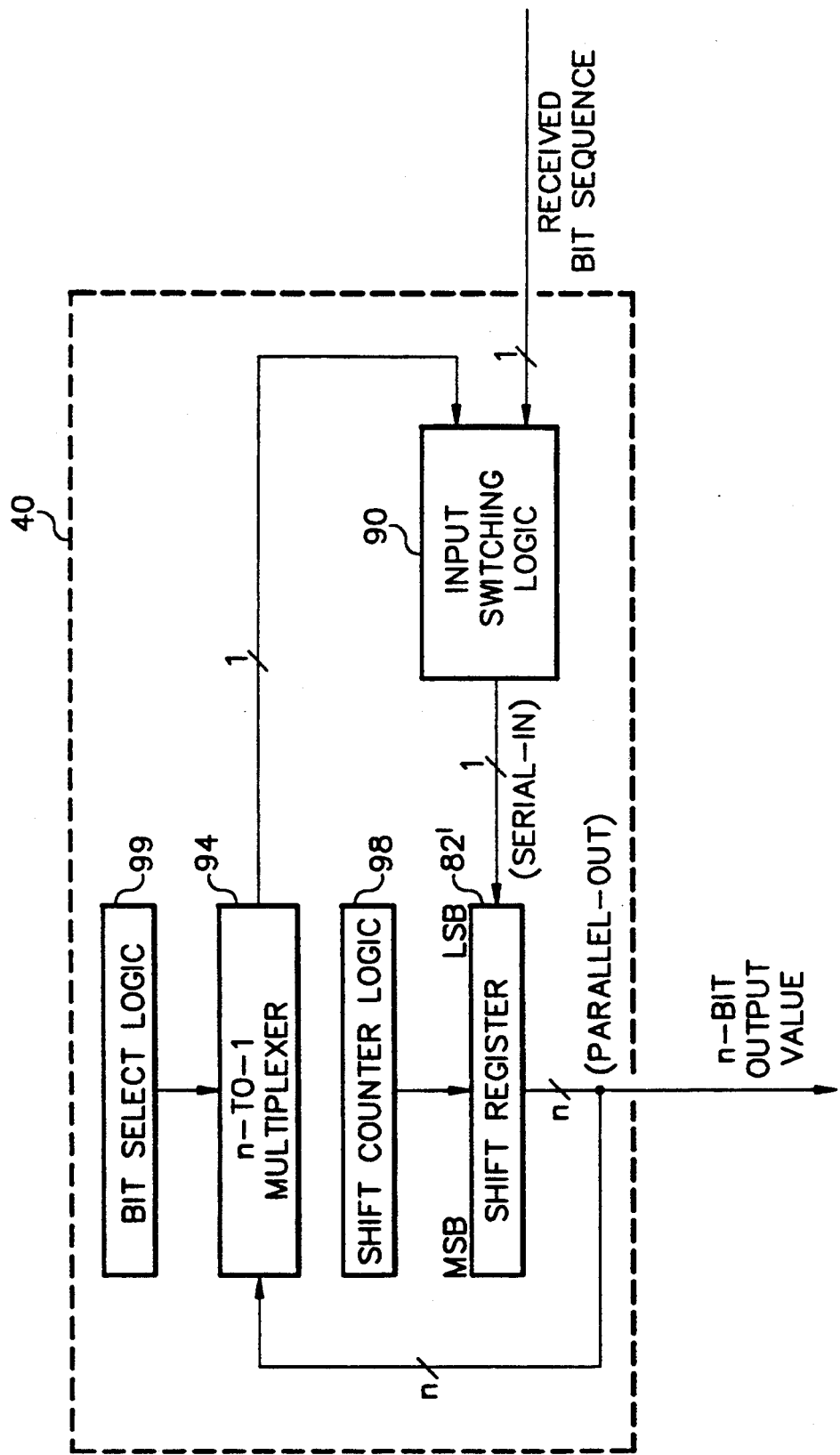
FIG. 9 illustrates a specific hardware implementation of the output value generation logic block of FIG. 8.

There are a number of ways to implement this process using simple digital hardware; one such implementation is illustrated in FIG. 9, wherein the sequence of received bits is stored right-justified in a serial-in/parallel-out shift register 82' of size n, where n is the output device bit depth. The output of shift register 82' is connected to an n-to-1 multiplexer 94, and the output of the multiplexer is fed back to the serial input for the shift register 82' through an input switching logic 90. The input switching logic 90 selects whether the serial input is the received bit sequence or the output of the multiplexer 94. For each pixel value that is to be reconstructed, the input switching logic is initially set to pass the received bits to the shift register 82', and after passing these bits for initialization, the input switching logic is set to pass the output of the multiplexer 94 to the shift register 82'. Using a bit select logic 99, the next bit to be repeated and appended is selected as the output value of the multiplexer 94, and this bit is left-shifted into the least significant bit of the shift register 82'. This process of selecting a bit and appending it is repeated until the shift register contains the repeated pattern. A shift counter logic 98 determines the total number of shifts required to produce the desired output pattern from register 82'. The bit extracted by the multiplexer is always the mth bit, if m bits have been received, and the total number of shifts required to fill the shift register is n-m. Register 82' outputs in parallel the reconstructed n-bit output value used to represent the pixel using the full dynamic range approach described previously.

Recovering previously received bits

Figure 10:
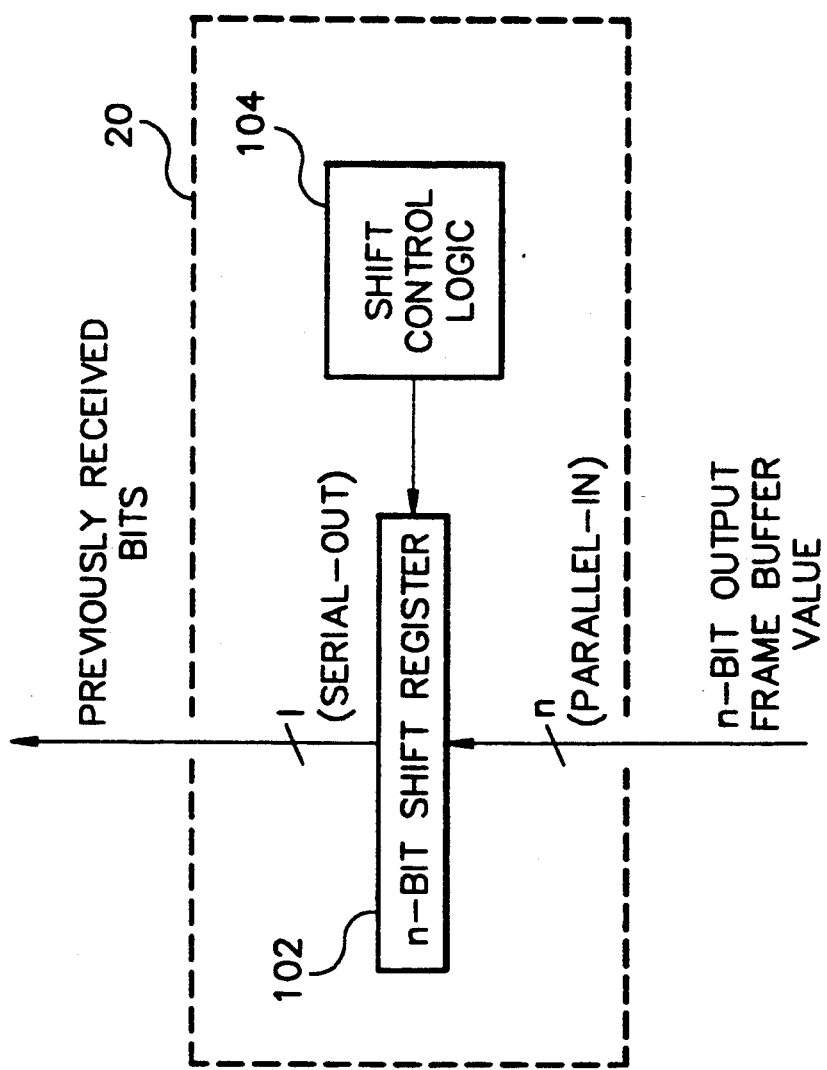
FIG. 10 illustrates in block diagram form a method for recovering previously received bits from the output buffer values.

Based upon the examples given in Tables 2 and 3, a means for recovering previously received bits from the output buffer value will now be described. From these tables, we see that for both the mean value approach and the full dynamic range approach, the binary representation of the output value always contains the received bits as the first m bits of the output value, if m bits have been received. Referring to FIG. 10, the previously received bits can be recovered by placing the n-bit output value into a shift register 102, and then shifting out the desired m bits. The number of bits shifted out is controlled by a shift control logic block 104.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

I claim:

1. A method for generating n-bit output values in a progressive bit plane reconstruction scheme, wherein an image is represented by a matrix of pixel values with each pixel value being represented by k bits, and wherein each bit plane is formed from the matrix of ordered bits in the k-bit representation, comprising, for each pixel, the steps of:
   a) receiving one or more bits of the k-bit representation to produce a sequence of m bits, where m represents the total number of received bits;
   b) forming an n-bit output value by combining an n-m bit sequence with the sequence of m bits of step a);
   c) buffering the formed n-bit output value;
   d) recovering tile previously received m bits from the buffered n-bit output value by shifting the n-bit output value;
   e) receiving one or more of the k-m bits of the k-bit representation;
   f) combining, if the k-m bits are received, the received bits of step e) with the recovered m bits of step d) to form a new m-bit sequence, where m is incremented to represent the number of received bits;
   g) forming a new n-bit output value by combining an n-m bit sequence with the m-bit sequence of step f);
   h) buffering the formed n-bit output value of step g); and
   i) repeating steps d) through h) to a received bit depth.

2. The method according to claim 1 wherein steps d) through h) are repeated until n-m equals 0, if k>n, or until k-m equals 0, if n>k.

3. The method according to claim 1 wherein the n-bit output value of steps b) and g) is produced by appending the n-m bit binary value sequence of binary zero followed by binary ones to the m-bit sequence.

4. The method according to claim 1 wherein the n-bit output value of steps b) and g) is produced by repeating the received m-bit sequence until the repeated sequence contains n-m bits and by appending said repeated sequence to the new m-bit sequence.

5. The method according to claim 1 wherein one or more of the buffered n-bit output values of steps c) and h) are made available to a display for viewing.

6. A method for generating n-bit output values in a progressive bit plane reconstruction scheme, wherein an image is represented by a matrix of pixel values with each pixel value being represented by k bits, ordered from most significant bit to least significant bit, and wherein each bit plane is formed from the matrix of ordered bits in the k-bit representation, comprising, for each pixel, the steps of:

a) receiving one or more bits of the k-bit representation, starting with the most significant bit and proceeding in order to the less significant bits, to produce a sequence of m bits, where m represents the total number of received bits;

b) forming an n-bit output value by appending an n-m bit sequence to the sequence of m bits of step a);

c) buffering the formed n-bit output value;

d) recovering the previously received m bits from the buffered n-bit output value by shifting the n-bit output value;

e) receiving one or more of the k-m next most significant bits of the k-bit representation;

f) appending the received bits of step e) to the recovered m bits of step d) to form a new m-bit sequence, where m is incremented to represent the number of received bits;

g) forming a new n-bit output value by appending an n-m bit sequence to the m-bit sequence of step f);

h) buffering the formed n-bit output value of step g); and i) repeating steps d) through h) to a received bit depth.

7. The method according to claim 6 wherein steps d) through h) are repeated until n-m equals 0, if k>n, or until k-m equals 0, if n>k.

8. The method according to claim 6 wherein the n-m bit sequence of steps b) and g) is the n-m bit binary value sequence of binary zero followed by binary ones.

9. The method according to claim 6 wherein the n-m bit sequence of steps b) and g) is formed by repeating the received m-bit sequence until the repeated sequence contains n-m bits.

10. The method according to claim 6 wherein one or more of the buffered n-bit output values of steps c) and h) are made available to a display for viewing.

11. An apparatus for generating n-bit output values in a progressive bit plane reconstruction scheme, from an image that is represented by a matrix of pixel values with each pixel value being represented by k bits, ordered from most significant bit to least significant bit, and wherein each bit plane is formed from the matrix of ordered bits in the k-bit representation, comprising:

a) combination logic means for receiving on a first input one or more bits of the k-bit representation and for receiving on a second input recovered previously received bits and for combining the bits received from said first input with the bits received from said second input to produce a sequence of m bits, where m represents the total number of received bits;

b) output value generation logic means for forming an n-bit output value by combining an n-m bit sequence with the sequence of m bits from said combination logic means;

c) buffer means for buffering the formed n-bit output value from said output value generation logic means; and d) logic means for recovering all previously received m bits from the buffered n-bit output value and for providing the recovered previously received m bits to the second input of said combination logic means.

12. The apparatus according to claim 11 wherein said output value generation logic means is comprised of:

bit sequence generation means for providing an n-m bit sequence having a binary representation sequence of binary zero followed by binary ones; and output buffer means having a first input for receiving the sequence of m bits from said combination logic means, and a second input for receiving the n-m bit sequence from said bit sequence generation means, said output buffer means appending said second input to said first input to provide an n-bit output value.

13. The apparatus according to claim 11 wherein said output value generation logic means is comprised of:

initialization means for providing an n-bit sequence having a binary representation sequence of binary zero followed by binary ones;

shift register means having a first input for receiving the n-bit sequence from said initialization means to establish its initial value and having a second input for receiving the m-bit sequence from said combination logic means; and input logic means for controlling said shift register means so as to cause said shift register to be initialized with the n-bit sequence of said initialization means and to cause the m-bit sequence from said combination logic means to be shifted sequentially into the most significant bit location of said shift register so as to produce an n-bit output value after m shifts.

14. The apparatus according to claim 11 wherein said output value generation logic means is comprised of:

logic means for receiving the sequence of m bits from said combination logic means and for repeating said m-bit sequence to produce a sequence of n-m bits; and output buffer means having a first input for receiving the sequence of m bits from said combination logic means, and a second input for receiving the n-m bit sequence from said logic means, said output buffer means appending said second input to said first input to provide an n-bit output value.

15. The apparatus according to claim 11 wherein said output value generation logic means is comprised of:

shift register means having a first input for receiving a logic selected input signal and a second input for receiving a control signal for shifting into said first input a selected number of bits and having an output for providing signals indicative of said shift register's contents;

input switching logic means for providing said logic selected input signal selected from one of two inputs, wherein a first input is the m-bit sequence from said combination logic means and a second input is a binary value selected from said shift register's contents, and wherein the input switching logic is initially set to pass the m bits from the first input and set to pass the second input thereafter;

multiplexer means for receiving the provided signals from said shift register means and in response to a bit selection signal provides as an output the binary value associated with the mth bit location selected from the provided signals to the second input of said input switching logic means;

bit select logic means for selecting the mth bit location the binary value of which is the output of said multiplexer means; and shift counter logic means for providing a control signal to said shift register means for shifting in a selected number of bits from said input switching logic means wherein m bits are shifted in when the input switching logic is set to pass its first input and n-m bits are shifted in when the input switching logic is set to pass its second input, and wherein the output of said shift register is the desired n-bit output value after a total n shifts.

16. The apparatus according to claim 11 and further comprising, display means connected to the output of said buffer means for viewing one or more of the buffered n-bit output values.

17. The apparatus according to claim 11 wherein said recovery logic means is comprised of:

shift register means having a first input for receiving said buffered n-bit output value and a second input for receiving a control signal causing said shift register to shift out to said combination logic means the m most significant bits as the recovered previously received m bits; and shift control logic means for providing the control signal to said shift register.

* * * * *